(12) United States Patent
Hall

(10) Patent No.: US 7,607,807 B2
(45) Date of Patent: Oct. 27, 2009

(54) VEHICULAR LAMP AND RETAINER ASSEMBLY FOR INTERIOR APPLICATIONS

(75) Inventor: Philip Hall, Cookeville, TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 471 days.

(21) Appl. No.: 10/945,217

(22) Filed: Sep. 20, 2004

(65) Prior Publication Data

US 2006/0061128 A1 Mar. 23, 2006

(51) Int. Cl.
*B60Q 1/00* (2006.01)
*B60Q 1/26* (2006.01)
*F21V 15/00* (2006.01)
*B60R 13/02* (2006.01)
*B25G 3/18* (2006.01)

(52) U.S. Cl. .............. 362/488; 362/490; 362/493; 362/365; 296/215; 403/329

(58) Field of Classification Search .............. 365/490; 296/215; 403/329; 362/490, 215, 365, 368, 362/488, 493
See application file for complete search history.

(56) References Cited

U.S. PATENT DOCUMENTS

| | | | | |
|---|---|---|---|---|
| 2,117,762 A | * | 5/1938 | Douglas | 362/519 |
| 3,476,928 A | | 11/1969 | Greasley | |
| 4,142,227 A | * | 2/1979 | Aikens | 362/480 |
| 4,293,895 A | * | 10/1981 | Kristofek | 362/147 |
| 4,313,154 A | * | 1/1982 | Capostagno et al. | 362/365 |
| 5,070,434 A | * | 12/1991 | Suman et al. | 362/490 |
| 5,239,449 A | * | 8/1993 | Wnuk et al. | 362/490 |
| 5,377,087 A | * | 12/1994 | Yoon | 362/275 |
| 5,404,297 A | * | 4/1995 | Birk et al. | 362/421 |
| 5,441,339 A | * | 8/1995 | Mathias et al. | 362/490 |
| 5,725,302 A | * | 3/1998 | Sirkin | 362/365 |
| 5,758,959 A | * | 6/1998 | Sieczkowski | 362/365 |
| 5,941,625 A | * | 8/1999 | Morand | 362/148 |
| 5,951,155 A | * | 9/1999 | Lanser | 362/490 |
| 6,000,818 A | * | 12/1999 | Caluori | 362/365 |
| 6,003,928 A | | 12/1999 | Curtindale | |
| 6,164,802 A | * | 12/2000 | Gromotka | 362/375 |
| 6,474,846 B1 | * | 11/2002 | Kelmelis et al. | 362/365 |
| 6,773,151 B2 | * | 8/2004 | Brown | 362/519 |
| 7,300,189 B2 | * | 11/2007 | England et al. | 362/486 |
| 2003/0035300 A1 | * | 2/2003 | Branstetter | 362/549 |
| 2005/0174791 A1 | * | 8/2005 | Bynum | 362/490 |

\* cited by examiner

*Primary Examiner*—Jong-Suk (James) Lee
*Assistant Examiner*—David J Makiya
(74) *Attorney, Agent, or Firm*—Robert L. Stearns; Dickinson Wright PLLC

(57) ABSTRACT

A vehicular light assembly (10) is held in an operative position within a liner (12) by an intermediate retainer (32) which has spring-like tongues (42). The retainer (32) is held in position on the liner (12) by fixation tabs (36) which are bent through the receiving hole (18) and pinch the liner (12) against a mounting plate (34) of the retainer (32). Segmented shoulders (46) on a sidewall (20) of the light assembly (10) are received in channels (48) on each of the tongues (42) and seat above the tips (44) of each tongue (42) to retain the light assembly (10) in its operative position. By simple application of a manual force, a service person is able to install or remove the light assembly (10) from its operative position in the liner (12). Thus, no tools are required to install or service the light assembly (10). Furthermore, the intermediate retainer (32) functions as a single unit to interconnect the liner (12) and the light assembly (10).

15 Claims, 3 Drawing Sheets

VEHICULAR LAMP AND RETAINER ASSEMBLY FOR INTERIOR APPLICATIONS

BACKGROUND OF THE INVENTION

1. Field of the Invention

The subject invention relates to a light system for use in an interior passenger compartment of a vehicle, and more particularly toward an improved light and retainer assembly for installing and removing the light system without the use of tools.

2. Related Art

In vehicular passenger compartments, general illumination is accomplished through interior lights placed in locations such as headliners, door panels, roof pillars, and the like. Of particular concern for automobile manufacturers and designers is the method in which such interior lights are held in position on the headliner, in the case of a dome lamp, or other decorative liner. The mounting method must provide secure connection to the liner, which is often a flexible, sheet-like member, and also facilitate connection of the light assembly. In such situations, one or more brackets may be used to interconnect the light assembly to the decorative liner. The bracket assembly may employ screws or other fastening methods to ensure a solid connection between the light assembly and the decorative liner. In the case of multi-piece bracket constructions, the assembly process can be burdensome, and various tools are usually required to complete the light installation process.

There exists a need for a light and retainer assembly which will permit installation and removal of the light assembly relative to a decorative liner without the use of tools or tool actuated fastening elements.

SUMMARY OF THE INVENTION

A vehicular liner and interior light system comprises a decorative liner having a presentation side, a hidden side, and a receiving hole. The liner may be a headliner, a door panel, or other decorative cover used in an interior passenger compartment. An interior light having a side wall is received into the receiving hole of the liner. An intermediate retainer has a mounting plate which is attached on the liner adjacent the receiving hole. The retainer includes a resilient catch for engaging the side wall of the interior light to retain the interior light in an operative position in the receiving hole in the liner. The resilient catch is removable upon the application of sufficient force to release the sidewall and allow movement of the interior light away from the operative position.

The retainer of the subject invention allows the interior light to be installed and removed in the liner without the use of tools. The resilient catch engages the sidewall of the interior light and functions to hold it in the operative position during normal operation. However, during service for bulb interchanges and the like, the interior light can be disengaged from the presentation side of the liner by manually urging it away from its operative position. The resilient catch releases the sidewall and allows the interior light to move out of the receiving hole in the liner. By obviating the need for installation and removal tools, the subject invention provides a more convenient system for mounting an interior light in a vehicular liner.

BRIEF DESCRIPTION OF THE DRAWINGS

These and other features and advantages of the present invention will become more readily appreciated as the same becomes better understood by reference to the following detailed description when considered in connection with the accompanying drawings, wherein.

DETAILED DESCRIPTION OF THE PREFERRED EMBODIMENT

Figure 1:
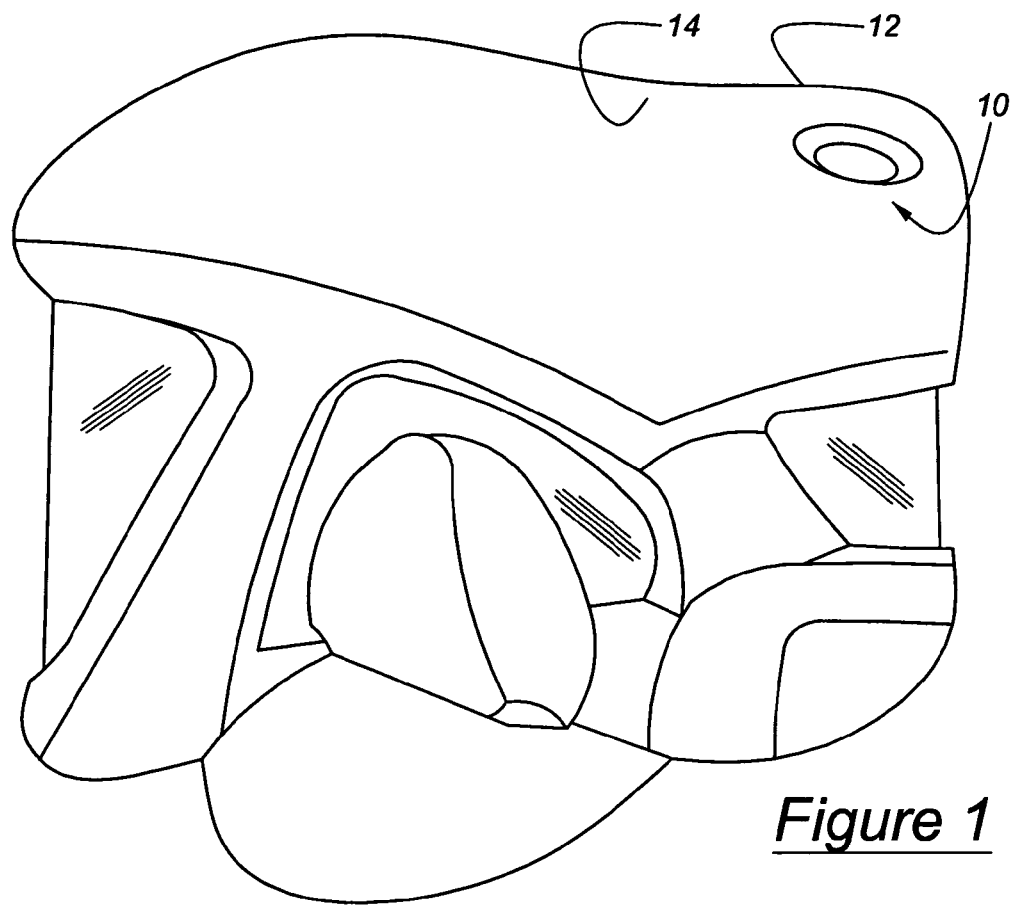
FIG. 1 is an interior perspective view in a typical vehicular passenger compartment showing an interior light system according to the subject invention mounted, for example, in a vehicular headliner.

Referring to the Figures, wherein like numerals indicate like or corresponding parts throughout several views, a light assembly according to the subject invention is generally shown at 10 in FIG. 1 disposed in a headliner 12 along the roof of an automobile. Those of skill in the art will appreciate that the light assembly 10 may be deployed with equal effectiveness in other liner applications, such as in a door panel liner, a roof pillar liner, or other liner applications within a passenger compartment. The liner 12, regardless of its function as a headliner, door panel, seat cover, etc., will include a presentation side 14 and a hidden side 16. The presentation side 14 is that which an occupant in the passenger compartment will see. The hidden side 16 is placed against structural or other components and is typically not seen by a passenger. Somewhere in the expanse of the liner 12, is provided a receiving hole 18 for the light assembly 10. The liner 12 may be constructed of fabric, paneling, fiberboard, or other sheet-like material.

Figure 2:
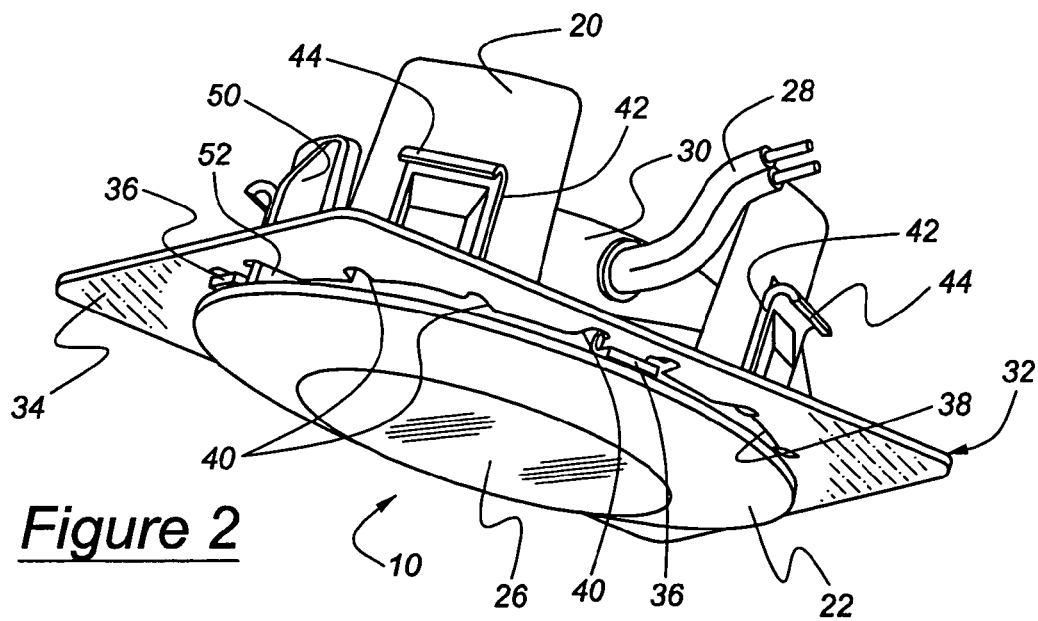
FIG. 2 is a perspective view of an interior light and retainer assembly according to the subject invention.
Figure 3:
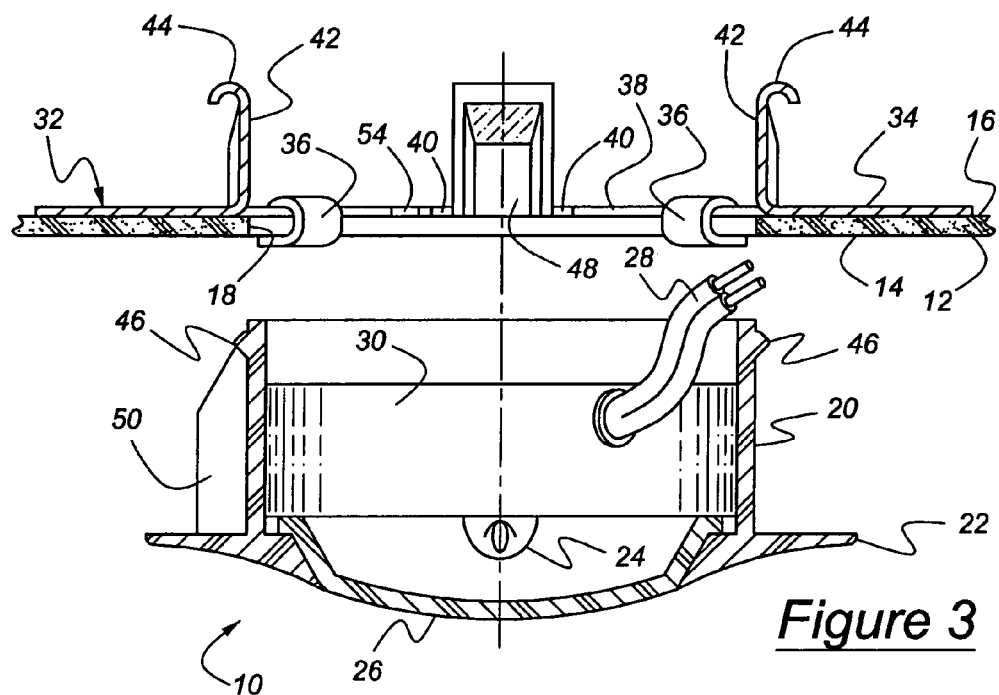
FIG. 3 is a partially exploded cross-section showing a retainer mounted to a liner, with a light assembly disengaged from the retainer but aligned in presentation for movement into an operative position.
Figure 4:
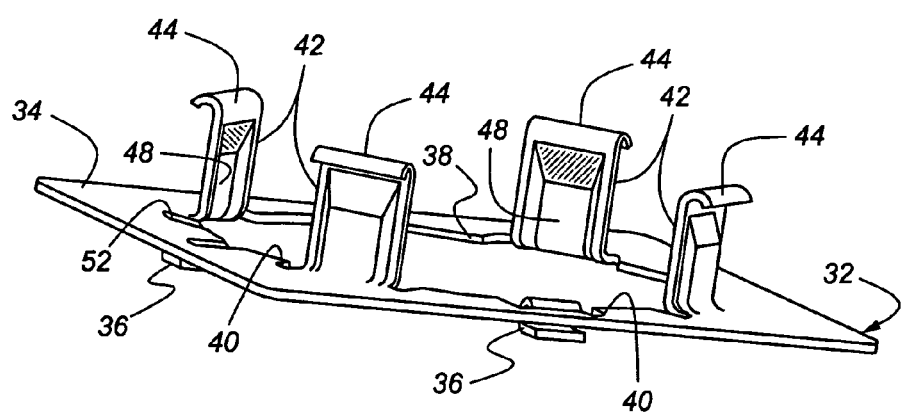
FIG. 4 is a perspective view of the retainer.

Referring now to FIGS. 2 and 3, the light assembly 10 is shown including a sidewall 20 which may be an enclosed annular or box shape, or as shown in the drawings, of a segmented generally annular configuration. The sidewall 20 extends from a flange-like bezel 22 which may take any geometric form but which is shown in the drawings as annular. The bezel 22 forms a decorative cover to seat against the presentation side 14 of the liner 12 and hide the retention components from view.

The light assembly 10 may be of any known type, but for illustrative purposes is shown as including an incandescent bulb 24 protected behind a lens 26. As an alternative to the bulb 24, LED devices, fluorescent devices, and the like can also be used. Power cord 28 extends from a sub-housing 30 in which electrical connections and a bulb socket are contained.

Figure 5:
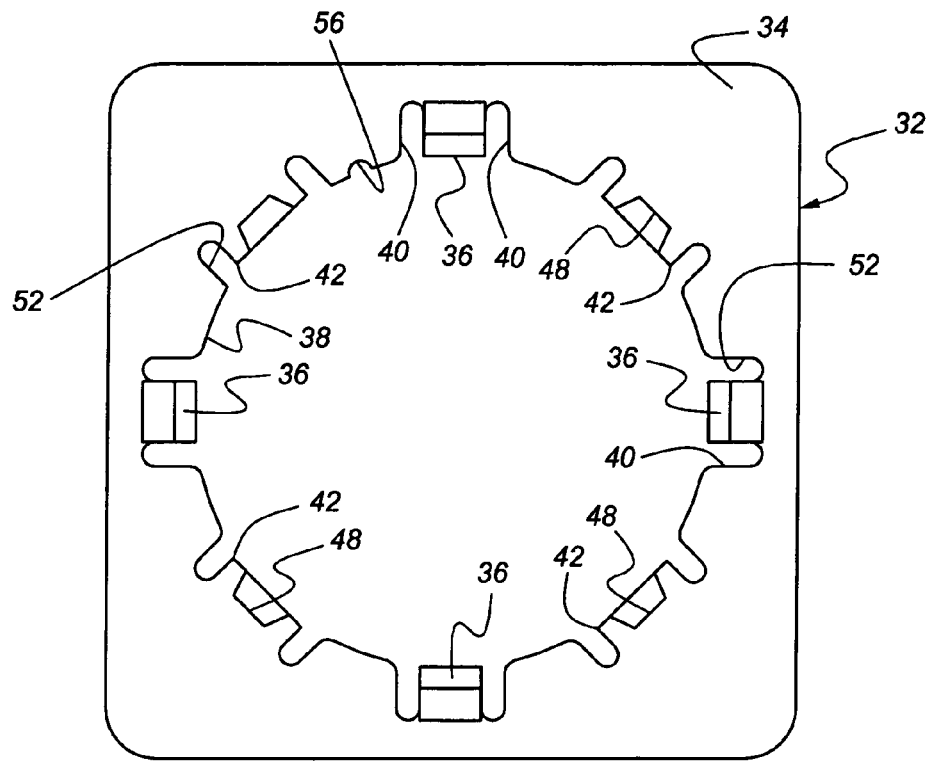
FIG. 5 is a bottom view of the retainer (as seen from the presentation side of a liner)
Figure 6:
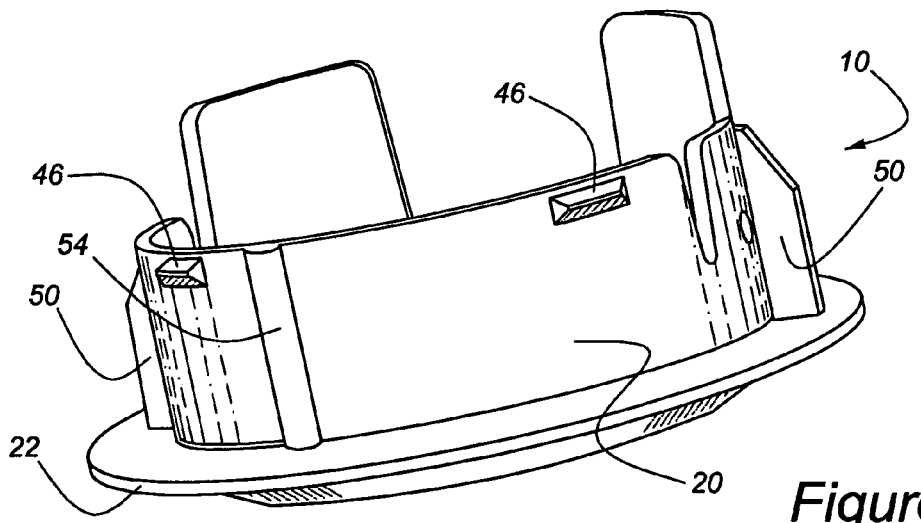
FIG. 6 is a perspective view of the interior light side wall, and in particular showing the locater rib.

An intermediate retainer, generally indicated at 32, has a mounting plate 34 which is fixedly disposed on the hidden side 16 of the liner 12 adjacent the receiving hole 18. Various means of adjoining the mounting plate 34 to the liner 12 can be employed, including adhesive and mechanical means, however in the preferred embodiment fixation tabs 36 extend radially inwardly from a central aperture 38 in the mounting plate 34. The fixation tabs 38 are pliable and, during initial installation, are bent through the receiving hole 18 and compressed against the presentation side 14 of the liner 12 so as to hold the mounting plate 34 in an aligned position over the receiving hole 18. As perhaps best shown in FIG. 5, four such fixation tabs 36 are spaced equally about the central aperture 38. Flanking each fixation tab 36 are relief pockets 40.

The retainer 32 also includes a plurality of resilient catches for engaging the sidewall 20 of the light assembly 10 to retain the light assembly 10 in an operative position in the receiving hole 18 of the liner 12. The light assembly 10 is shown in its operative position in FIGS. 1 and 2. The resilient catch is movable upon the application of sufficient force to release the sidewall 20 and allow movement of the light assembly 10 away from its operative position, as shown in FIG. 3. The catches are supported on the mounting plate 34 and comprise cantilever tongues 42. Preferably four such tongues 42 are spaced equally about the central aperture 38, equidistant from the fixation tabs 36. Each tongue 42 includes a tip 44 which may be rounded, or curled rearwardly, away from the central aperture 38.

The tip 44 of each tongue 42 is adapted to engage a segmented shoulder 46 on the sidewall 20 when the light assembly 10 is disposed fully in its operative position. To facilitate insertion of the light assembly 10 through the central aperture 38 of the retainer 32, each tongue 42 includes a channel 48 adjacent the mounting plate 34 for receiving the segmented shoulder 46, which has a length slightly less than the width of the channel 48. The channel 48 thus extends from an opening adjacent the mounting plate 48 to a tapered termination point spaced just below the tip 44. Thus, as the light assembly 10 is moved toward the operative position, its segmented shoulders 46, corresponding in position to the tongues 42, are received in the respective channels 48 and, upon approaching the termination point of each channel 48, flex the cantilevered tongues 42 outwardly until the shoulders 46 pass their respective tip 44. In the fully operative position (FIGS. 1 and 2), the shoulder 46 of each tongue 42 is seated above the respective tip 44. By this manner, the spring-like resiliency of the tongues 42 gripping against the sidewall 20 and under the shoulders 46 retain the light assembly 10 in its operative position relative to the retainer 32 and the liner 12.

A key is disposed between the light assembly 10 and the retainer 32 when in its operative position for preventing relative rotation between the two members. Specifically, the key feature includes at least one, and preferably multiple splines 50 extending like fins from the sidewall 20 of the light assembly 10. Complimentary keyways 52 are formed in the mounting plate 34 of the retainer 32 for receiving each spline 50. In the preferred embodiment, the keyways 52 also function as relief pockets flanking each side of the tongues 42. Thus, as the light assembly 10 is moved toward the operative position, the splines 50 register with keyways 52 to ensure that the shoulders 46 travel a straight path along the tongues 42 and seat behind the respective shoulders 46 without being permitted to rotate out of full engagement.

An orientation member is also provided for establishing a single permissible orientation between the light assembly 10 and the retainer 32 by which it can be moved into the operative position. In the case of the preferred embodiment in which the components are generally annular, the orientation member includes a rib 54 extending longitudinally along the sidewall 20 of the light assembly 10. A complimentary notch 56 in the mounting plate 34 receives the rib 54 to locate the light assembly 10 relative to the retainer 32. The rib 54 is incapable of passing through the central aperture 38 except it be aligned and register in the notch 56. Thus, the orientation member assures proper positioning of the light assembly 10 in the liner 12. This may be important for many reasons. For example, the light emitted from the light assembly 10 may be intentionally directional within the passenger compartment. Or, there may be structural or wiring features behind the liner 12, which must be accommodated with proper orientation of the light assembly 10. Of course, other reasons may also exist for necessitating the orientation member. In cases were the components are not generally annular, the orientation feature may be accomplished by the geometric shape of the side wall 20.

The light assembly 10 is thus easily manipulated between its operative and inoperative positions by a simple manual force applied to the bezel 22. In this manner, an installer or repair person can quickly provide service to the light assembly 10 without requiring tools. Once in the operative position, as shown in FIGS. 1 and 2, the large bezel 22 completely eclipses the retainer 32, including the fixation tabs 36, thereby hiding from view these components as seen from the presentation side 14 in the passenger compartment.

The invention has been described in an illustrative manner, and it is to be understood that the terminology which has been used is intended to be in the nature of words of description rather than of limitation. Obviously, many modifications and variations of the present invention are possible in light of the above teachings. For example, the light assembly 10 and corresponding receiving hole 18 and aperture 38 can have shapes other than round, including square, rectangular, polygonal, irregular, etc. Also, the mounting plate 34 could be held against the presentation side 14 with the fixation tabs 36 compressing against the hidden side 16 of the liner 12. Those skilled in the art will appreciate many other variations of this invention. It is, therefore, to be understood that within the scope of the appended claims, the invention may be practiced otherwise than as specifically described. The invention is defined by the claims.

What is claimed is:

1. A vehicular liner and interior light system comprising:
   said liner having a presentation side, a hidden side, and a receiving hole;
   an interior light having a sidewall receivable into said receiving hole in said liner; and
   an intermediate retainer having a mounting plate fixedly disposed on said liner adjacent said hole so that said intermediate retainer is exclusively supported by said liner, said retainer including a resilient catch for directly engaging said sidewall of said interior light to retain said interior light in an operative position in said receiving hole inside liner, said resilient catch movable upon the application of sufficient force to disengage from said sidewall and allow movement of said interior light away from said operative position and completely disconnect from said intermediate retainer while said resilient catch remains fixedly disposed relative to said liner adjacent said hole;
   whereby when said interior light is in said operative position with said sidewall thereof engaged by said resilient catch, said interior light is wholly supported by said liner via said intermediate retainer, wherein said resilient catch comprises at least one cantilever tongue extending from said mounting plate and wherein said tongue includes a tip, and said sidewall of said interior light includes a shoulder for engaging said tip of said tongue in said operative position.

2. A vehicular liner and interior light system as set forth in claim 1, wherein said mounting plate is fixedly disposed against said hidden side of said liner.

3. A vehicular liner and interior light system as set forth in claim 1, wherein said mounting plate includes a central aperture generally aligned with said hole in said liner.

4. A vehicular liner and interior light system as set forth in claim 3, wherein said mounting plate includes at least one fixation tab extending from said central aperture through said hole.

5. A vehicular liner and interior light system as set forth in claim 4, wherein said fixation tab compresses said liner against said mounting plate.

6. A vehicular liner and interior light system as set forth in claim 1, wherein said tongue has a width, and said shoulder is segmented about said sidewall and has a length less than the width of said tongue.

7. A vehicular liner and interior light system as set forth in claim 6, wherein said tongue includes a channel adjacent said mounting plate for receiving said segmented shoulder of said interior light, said channel terminating at a point spaced from said tip.

8. A vehicular liner and interior light system as set forth in claim 6, wherein a plurality of said tongues are disposed substantially symmetrically about said central aperture.

9. A vehicular liner and interior light system according to claim 1, wherein said interior light includes a bezel adjoining said sidewall and adapted to press against said presentation side of said liner when said interior light is in said operative position.

10. A vehicular liner and interior light system according to claim 9, wherein said bezel eclipses said retainer from said presentation side of said liner when said interior light is in said operative position, whereby said retainer remains hidden from view as seen from said presentation side.

11. A vehicular liner and interior light system according to claim 1, further including a key disposed between said interior light and said retainer when in said operative position for preventing relative rotation there between.

12. A vehicular liner and interior light system according to claim 11, wherein said key includes a spline extending fixedly from said interior light, and a complimentary keyway in said mounting plate for receiving said spline.

13. A vehicular liner and interior light system according to claim 1, further including an orientation member disposed between said interior light and said retainer.

14. A vehicular liner and interior light system according to claim 13, wherein said orientation member includes a rib extending longitudinally along said sidewall of said interior light, and a complimentary notch in said mounting plate for receiving said rib to locate said interior light relative to said retainer in a single predetermined orientation.

15. A vehicular liner and interior light system according to claim 1, wherein said liner comprises a headliner.

\* \* \* \* \*

UNITED STATES PATENT AND TRADEMARK OFFICE
CERTIFICATE OF CORRECTION

PATENT NO. : 7,607,807 B2  Page 1 of 1
APPLICATION NO. : 10/945217
DATED : October 27, 2009
INVENTOR(S) : Philip Hall It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 432 days.

Signed and Sealed this

Twelfth Day of October, 2010

David J. Kappos
*Director of the United States Patent and Trademark Office*